M. H. FISHER.
DRIVING GEAR FOR AUTOMOBILE TRUCKS.
APPLICATION FILED OCT. 10, 1917.
1,366,316.
Patented Jan. 18, 1921.
3 SHEETS—SHEET 1.
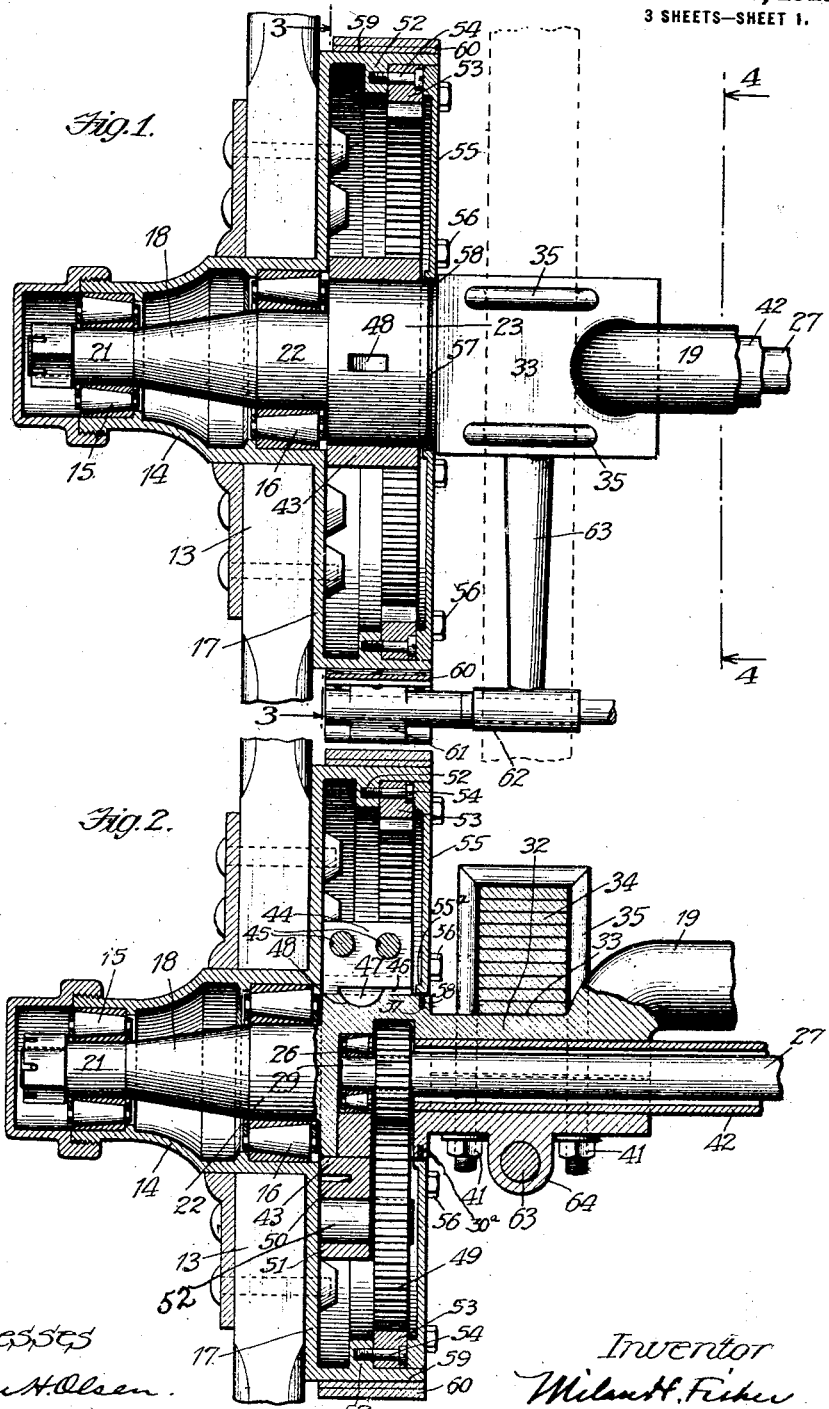
Witnesses
Martin H. Olsen
Robert Dobberman
Inventor
Milan H. Fisher
By Rector Hibbn Davis Macauley
His Attys

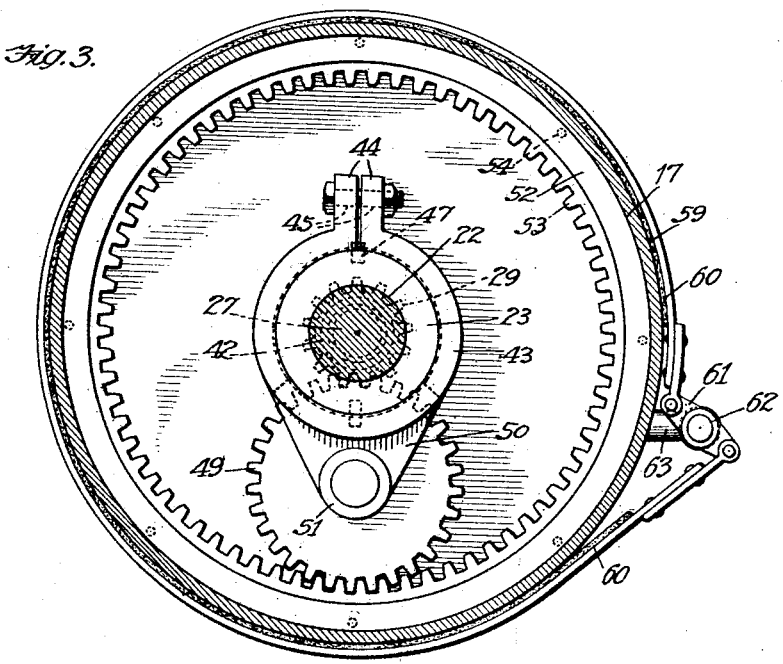
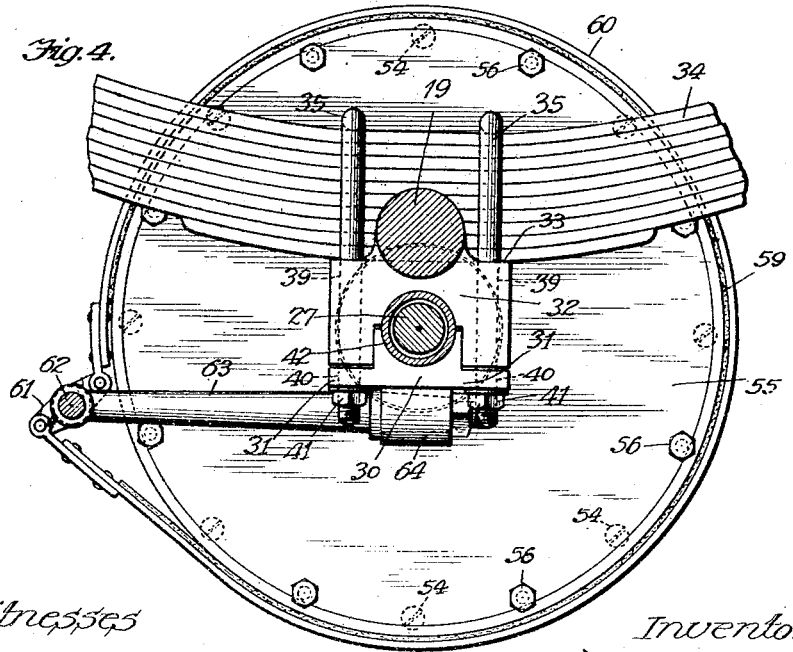

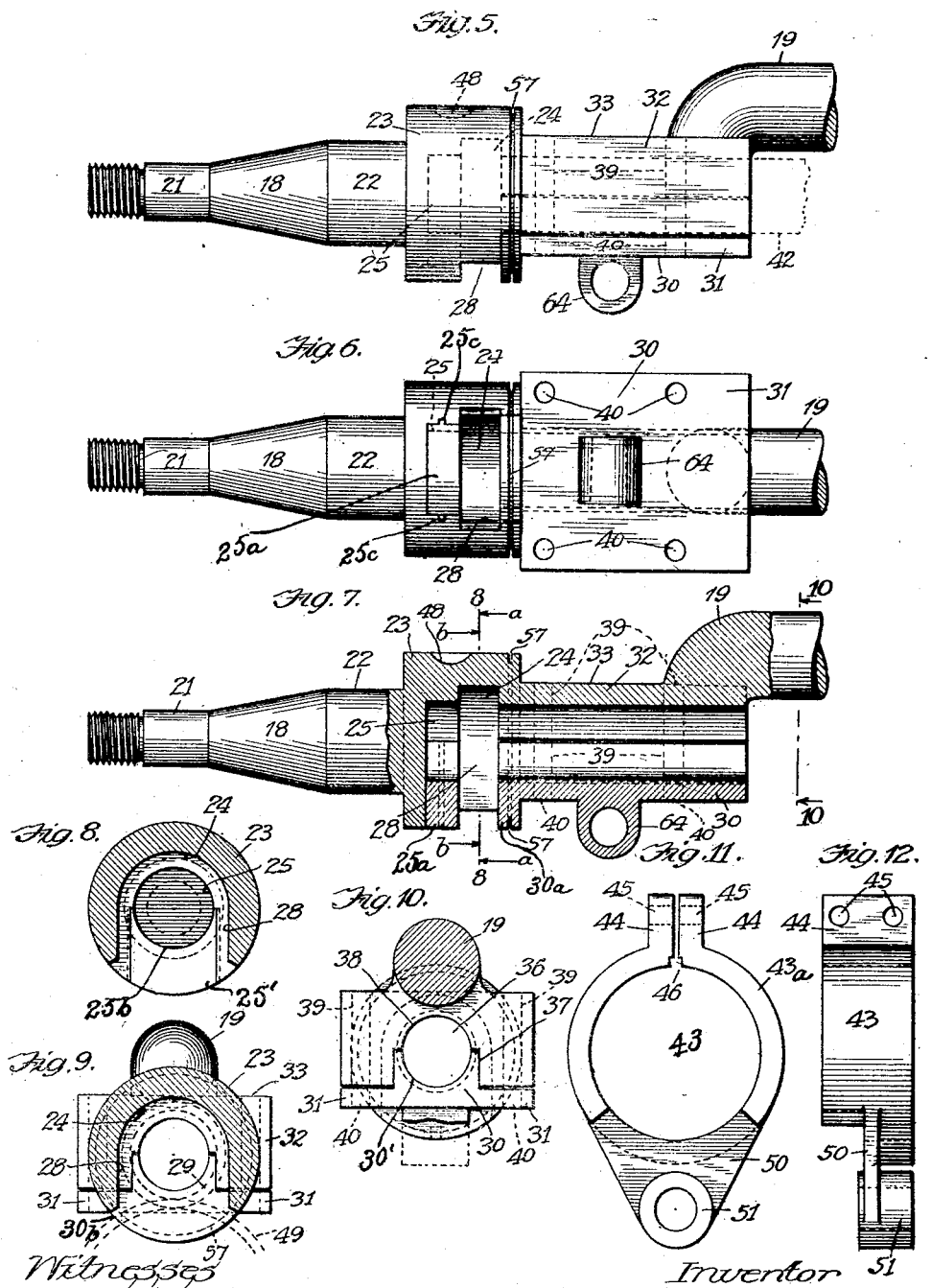

UNITED STATES PATENT OFFICE.

MILAN H. FISHER, OF CHICAGO, ILLINOIS, ASSIGNOR TO THE DONALDSON & FISHER COMPANY, OF CHICAGO, ILLINOIS, A CORPORATION OF ARIZONA.

DRIVING-GEAR FOR AUTOMOBILE-TRUCKS.

1,366,316.   Specification of Letters Patent.   Patented Jan. 18, 1921.

Application filed October 10, 1917. Serial No. 195,744.

*To all whom it may concern:*

Be it known that I, MILAN H. FISHER, a citizen of the United States, residing at Chicago, in the county of Cook and State of Illinois, have invented certain new and useful Improvements in Driving-Gears for Automobile-Trucks, of which the following is a specification.

My invention relates to that class of machines in which there is a substantial gear reduction between the differential and the wheels, which reduction is commonly effected by employing an internal gear on each wheel with which a pinion driven by a jack shaft from the differential engages. Among the objects of my invention are to provide a more simple and compact construction of increased strength, more fully protected from dust and better adapted to maintain within a pool of oil which partly covers the internal gear.

In the accompanying drawings I have shown a preferred embodiment of the invention, but it is to be understood that the specific disclosure is for the purpose of exemplification only, the scope of the invention being defined in the following claims in which I have endeavored to distinguish it from the prior art so far as known to me without, however, relinquishing or abandoning any portion or feature thereof.

In the drawings Figure 1 is a horizontal axial section of the preferred embodiment of my invention, parts being shown in elevation; Fig. 2 is a vertical axial section, parts being shown in elevation; Fig. 3 is a vertical transverse section on the line 3—3 of Fig. 1, looking in the direction of the arrows; Fig. 4 a similar section on the line 4—4 of Fig. 1, looking in the direction of the arrows; Fig. 5 is an elevation, Fig. 6 a plan and Fig. 7 a vertical axial section partly in elevation of so much of the axle as is necessary to illustrate the invention; Fig. 8 is a section upon the line 8—8 of Fig. 7, looking in the direction of the arrows *a;* Fig. 9 a section on the same plane but looking in the opposite direction indicated by the arrows *b;* Fig. 10 is a section on the line 10—10 of Fig. 7, looking in the direction of the arrows, and Figs. 11 and 12 are front and side elevations respectively of a detail.

Each part is identified by the same reference characters wherever it occurs throughout the several views.

The wheel 13 and hub 14 may be of any well known or desired form and the combined brake drum and gearing casing 17 is formed integral with the latter. The wheel is journaled upon the end 18 of the axle 19 by means of roller bearings 15, 16 which may be of any known type, it being understood that both ends of the axle and the wheels mounted thereon are similar though but one is shown. The axle 19 is formed or provided with an enlarged flattened upper surface 33 upon which the usual spring 34 is supported. Intermediate said spring and the wheel bearings the axle is formed with an enlarged generally cylindrical bearing 23 for a purpose which will now be explained. Said bearing is chambered at 24, the wall of the chamber, as shown more particularly in Fig. 8, being in its upper portion concentric with the exterior of the bearing and with the wheel bearing and is adapted to receive and form a housing for the pinion 29 upon the end of the jack shaft 27 which transmits motion from the differential (not shown) to the wheel. As shown more particularly in Figs. 2, 5 and 7, the axle 19 is offset upwardly between its ends and is axially chambered or recessed as at 36, see Figs. 7 and 10, to receive the shaft casing 42 which incloses said jack shaft. Chamber 36 is closed on its under side by a cap plate 30, the upward extension 37 of which is received into a rectangular recess in said axle and is formed with a semi-cylindrical seat 30′ which bears against casing 42. Spring 34 and said cap plate 30 are held on the respectively opposite sides of the flattened enlargement 33 of the axle by means of U-bolts 35 extending through holes 40 formed in said axle and cap plate for the purpose. The U-bolts 35 surround the spring and are held in place by nuts 41.

As shown more particularly in Figs. 7, 8 and 9, the chamber 24 is open at the bottom as at 28, the opening being partially closed by a flange 30$^a$ formed upon the cap plate 30 and extending partially into said chamber, said flange being shaped as at 30$^b$ to complete the circumference of the cylindrical bearing 23. The chamber 24 is formed with a concentric cylindrical recess 25 which is likewise open at the bottom as at 25', Fig. 8, but the opening is normally closed by a filler block 25ª, the upper end of which is cut away in the arc of a circle as at 25ᵇ to complete the cylindrical recess 25. Said recess forms a seat for bearing 26 which receives the end of jack shaft 27 and supports the same, the pinion 29 on said jack shaft occupying the chamber 24. Preferably the filler block 25ª is keyed as at 25ᶜ to maintain it against movement longitudinally of the axle and the outer surface 25ᵈ thereof is rounded to conform to the cylindrical periphery of bearing 23. The filler block 25ª is prevented from radial movement by means of the hanger or bracket 43, the collar or split band 43ª of which immediately surrounds the bearing and said filler block, see Figs. 2, 11, 12. The hanger is formed with flanges 44, 44 perforated to receive bolts 45 by which said collar is clamped upon the bearing. Said hanger also comprises a plate 50 with a perforated boss 51 which latter forms a seat for the arbor 52 of an idler pinion 49 which is in mesh with pinion 29. The hanger is prevented from rotation relative to said bearing by means of the Whitworth key 47 engaging groove 46 in said hanger and recess 48 in the bearing. Idler 49 also engages the internal gear or rack 53 secured by bolts 54 to an internal flange or rib 52 on the drum casing. Thus it will be understood that the jack shaft 27 is rotated from the differential and gear 29 therefore engaging idler 49 transmits movement through internal rack 53 to the wheel. The drum casing 17 is closed by the closure plate 55 which is bolted at 56 to the internal gear or rack, the joint between the two or between the periphery of the plate and the internal periphery of the drum being packed or rendered liquid tight in any suitable manner. Cover plate 55 is bored of a diameter to loosely fit the bearing 30 and formed with a flange 55ª about the opening, said bearing being grooved as at 57 to receive a felt or other washer 58, which bearing upon flange 55ª forms a substantially dust tight joint.

Cap plate 30 is formed with an ear 64 to receive rod 63 having at its outer end a bearing for a shaft 62 carrying a lever 61 by which the brake band 60 is controlled.

The operation of the device has already been described. It will be readily understood that the casing sleeve 42 by its location at the center of the axle stiffens the same, and by locating the jack shaft concentric with the wheel torsional strains are to a large extent eliminated and in the event of a slight displacement or warping of the axle or related parts the alinement of the driving mechanism is not so affected as to put it out of operation, as is the case where the jack shaft drives the internal gear directly and is located at a distance from the center thereof. Furthermore, because of the central location of the jack shaft I am enabled to reduce the diameter of the bearing between the opening of the closure plate for the drum casing and the stationary cooperating part as compared with machines in which the internal gear is driven directly from the jack shaft, not only decreasing the opportunity for the admission of dust to the operating mechanism but permitting the maintenance of a deep pool of oil in the drum casing into which the idler gear 40 and the internal gear dip, thus providing an efficient lubrication for the mechanism.

I claim:

1. In a device of the class described, a forging comprising an outer journal for the wheel, an enlarged intermediate portion and an inner portion, the intermediate enlarged portion being chambered and the inner portion having a longitudinally extending bore communicating with the chamber, a shaft in said bore, a pinion on the shaft within the chamber of the central enlarged portion of the forging, a bearing in the forging in which said shaft is journaled, a wheel journaled on the outer end of the forging, a housing secured to the wheel on the inner side thereof, an internal gear in the housing and an idler gear intermediate said internal gear and said pinion.

2. In a device of the class described, an axle, a wheel journaled on the axle, a casing mounted on the wheel, an internal gear on the casing, a jack shaft concentric with said gear and journaled on the axle, a pinion on the jack shaft, an idler gear intermediate the pinion and internal gear, a closure plate secured to and revolving with the casing and means for packing the joint between the closure plate and axle.

3. In a device of the class described, an axle having an offset end portion comprising a wheel journal and a chambered bearing, a jack shaft extending into the chamber of said bearing, a pinion on the jack shaft within the chamber, a bearing for the jack shaft on said axle, a hanger on said axle, an idler journaled on the hanger and engaging the pinion, a wheel mounted on the axle journal and an internal gear mounted on the wheel and engaging the idler.

4. In a device of the class described, an axle having an offset end portion comprising a wheel journal and a chambered bearing, a jack shaft extending into the chamber of said bearing and journaled therein, a pinion on the jack shaft within the chamber, a hanger surrounding the bearing, an idler journaled on the hanger and engaging said pinion, a wheel journaled on the axle, a casing mounted on the wheel, an internal gear mounted in the casing and engaging the idler, a cover plate on the casing and means for forming a close joint between the cover plate and axle.

5. In a device of the class described, an axle having an offset end portion comprising a wheel journal and a chambered bearing, a jack shaft extending into the chamber of said bearing and journaled therein, a pinion on said jack shaft and within the chamber, a casing surrounding the jack shaft and extending into the offset end of the axle, a cap plate engaging said casing and securing it to the axle, a flange on the cap plate closing the end of said chamber, a hanger surrounding the chamber bearing, an idler journaled on the hanger and engaging the pinion, a wheel journaled on the axle, a casing mounted on the wheel, an internal gear in the casing engaging said idler, a cover plate for the casing, and means for packing the joint between the axle and the cover plate.

6. In a device of the class described, an axle having an outer bearing portion at its end, a wheel journaled on said bearing portion, a casing on the wheel inward of said bearing portion, an internal gear in said casing, a jack-shaft journaled in the axle concentric with the wheel, a pinion on the jack-shaft, an idler intermediate the pinion and the internal gear, and an annular closure plate surrounding the axle and closing the inner side of the casing.

7. In a device of the class described, an axle, the end of which constitutes a bearing for a wheel, the wheel journaled thereon, a casing attached to the wheel inward of said journal portion, an internal gear in the casing, a jack-shaft journaled in the axle concentric with the wheel, a pinion on the jack-shaft in the plane of the internal gear, an idler gear intermediate said pinion and internal gear, a support for the idler gear on which the latter is journaled, said support being axially removable from the axle, and an annular plate closing the open side of the casing.

8. In a device of the class described, an axle, a wheel having a hub journaled on the end of the axle, a casing on the wheel having a closed outer side and an open inner side, an internal gear mounted in the casing, a jack-shaft journaled in the axle coaxially with the wheel, a pinion on the jack-shaft, an idler intermediate the pinion and the internal gear, a hanger keyed upon the axle, an idler journaled on the hanger, and an annular plate closing the open side of the casing.

9. In a device of the class described, a stationary axle, a wheel journaled on the end thereof comprising a hub, a casing, having a closed outer side and periphery, formed integral with the hub, an internal gear in the casing, a jack-shaft journaled coaxially with the wheel in the axle, a pinion on the jack-shaft, an idler intermediate said pinion and internal gear, a hanger keyed upon the axle within the casing and removable axially therefrom, and an annular plate closing the open side of the casing.

MILAN H. FISHER.